(12) United States Patent
Kadrnoska et al.

(10) Patent No.: US 7,576,283 B2
(45) Date of Patent: Aug. 18, 2009

(54) CABLE DUCT

(75) Inventors: Helmut Kadrnoska, Vienna (AT); Gerhard Reiss, Laxenburg (AT)

(73) Assignee: Wien Kanal-Aberwassertechnologien GesMbH, Vienna (AT)

( * ) Notice: Subject to any disclaimer, the term of this patent is extended or adjusted under 35 U.S.C. 154(b) by 73 days.

(21) Appl. No.: 11/872,124

(22) Filed: Oct. 15, 2007

(65) Prior Publication Data

US 2008/0251291 A1 Oct. 16, 2008

Related U.S. Application Data

(63) Continuation of application No. PCT/AT2005/000180, filed on May 25, 2005.

(30) Foreign Application Priority Data

Apr. 15, 2005 (AT) .................................. A 641/2005

(51) Int. Cl.
*H02G 15/24* (2006.01)

(52) U.S. Cl. .................. 174/21 JS; 174/101; 174/70 C; 174/70 R; 174/72 R; 174/72 A; 59/78.1

(58) Field of Classification Search ............... 59/78.1, 59/900, 82, 85; 248/49, 51; 138/120, 155, 138/168; 439/86, 181, 939; 174/72 A, 74 A, 174/69, 68.1, 21 JS, 97, 101, 111, 136, 95, 174/72 R, 70 C, 70 R See application file for complete search history.

(56) References Cited

U.S. PATENT DOCUMENTS

| | | | |
|---|---|---|---|
| 3,664,619 A * | 5/1972 | Heidrich et al. | 248/51 |
| 4,104,871 A | 8/1978 | Moritz | |
| 5,220,779 A | 6/1993 | Tatsuta et al. | |
| 6,107,565 A | 8/2000 | O'Rourke | |
| 6,156,974 A * | 12/2000 | Blase | 174/68.3 |
| 6,864,425 B2 * | 3/2005 | Ikeda et al. | 174/74 A |
| 7,211,730 B2 * | 5/2007 | Ikeda et al | 174/69 |
| 7,418,812 B2 * | 9/2008 | Ikeda et al. | 59/78.1 |
| 2002/0108365 A1 | 8/2002 | Blase et al. | |

FOREIGN PATENT DOCUMENTS

| | | |
|---|---|---|
| DE | 36 05 382 A1 | 8/1987 |
| DE | 196 53 016 A1 | 7/1998 |

* cited by examiner

*Primary Examiner*—Dhiru R Patel
(74) *Attorney, Agent, or Firm*—Laurence A. Greenberg; Werner H. Stemer; Ralph E. Locher

(57) ABSTRACT

A cable duct is provided for cables to be laid along walls or tops of subterranean tubes, ducts, etc. for the transport of water, energy, data, optical fiber cables, etc. The cable duct is installed in the tube from a surface through access shafts and fixed to the duct. The cable duct is formed by cable duct body elements, disposed one behind the other in a longitudinal direction, connected to one another at the ends thereof such as to be pivoted relative to one another at a lateral angle about a lateral pivot axis. Each of the body elements is formed by two cover plates and connected to one another by a web. Laterally open chambers are disposed on both sides of the web for housing the cables. The chambers are sealed by edge cover strips forming two closed longitudinal chambers with the connected angularly adjustable body elements.

19 Claims, 5 Drawing Sheets

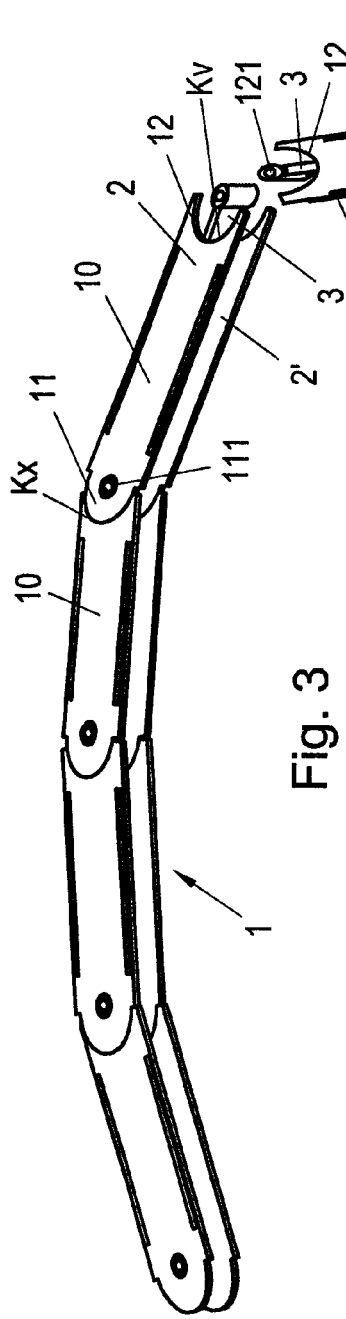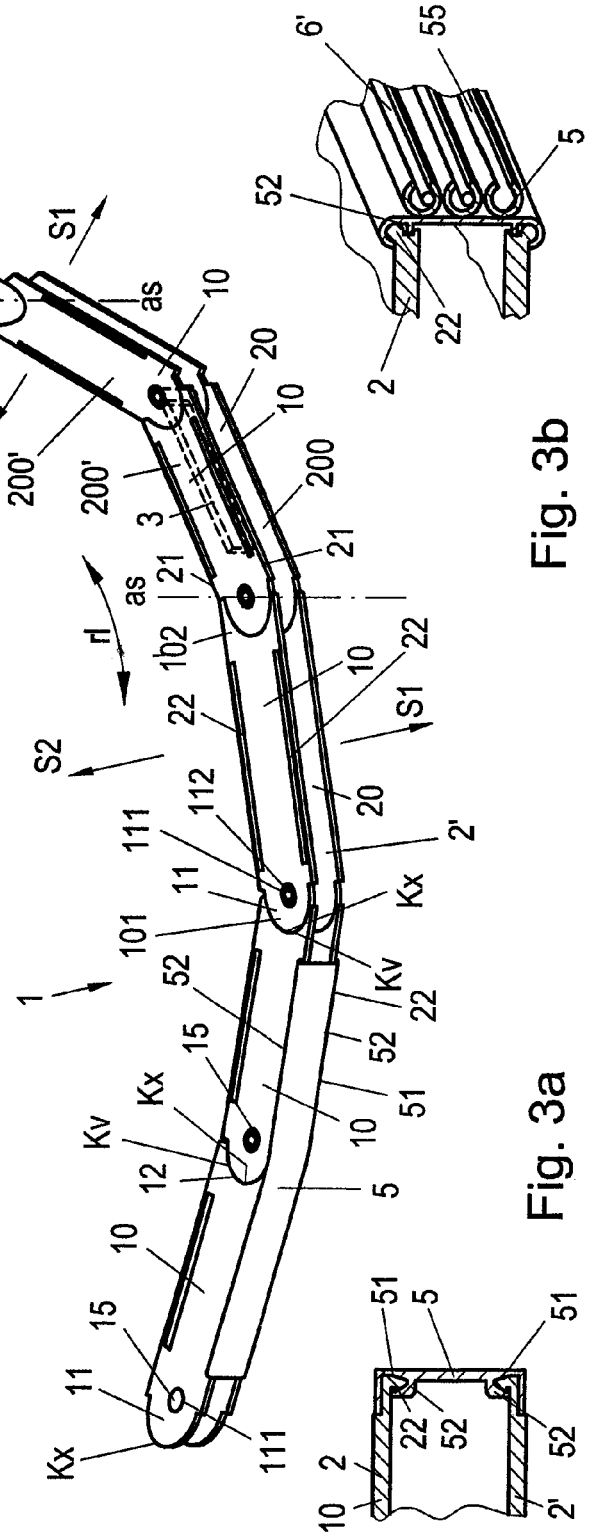

CABLE DUCT

CROSS-REFERENCE TO RELATED APPLICATIONS

This is a continuing application, under 35 U.S.C. §120, of copending International application PCT/AT2005/000180, filed May 25, 2005, which designated the United States; this application also claims the priority, under 35 U.S.C. §119, of Austrian patent application A 641/2005, filed Apr. 15, 2005; the prior applications are herewith incorporated by reference in their entirety.

BACKGROUND OF THE INVENTION

Field of the Invention

The invention relates to a novel cable duct for cables or cable lines which are to be laid along walls, partitions and, in particular, tops of subterranean tubes, vaults, tunnels, ducts, shafts or the like that extend generally horizontally, diagonally ascending or descending and/or curved or with bends, preferably for conducting water or sewage, for energy and electrical transport, telephones, data and information transfer and the like, in particular for glass fiber and optical conductor cables or cable lines, whereby the novel cable duct may be inserted or pulled in from the surface into the tube, vault and the like through generally vertical or diagonal access or branch shafts respectively, and fastened to its wall, partition and, in particular, top.

The high growth rate in the field of information technology and telecommunications, but also the ever increasing power demand has made a large-scale construction of the systems of transmission lines and cables of the most varied types and their interconnection necessary in the last few years.

Even in those fields with few obstacles, the lines or cables provided for the noted purposes are no longer laid to a large extent over e.g. trouble-prone overhead lines in the country, but, if possible, underground whereby, although the excavation work required for this is relatively expensive, it is in essence hampered relatively little by other infrastructures, buildings, underground installations or the like.

Laying lines of this type under the surface in congested city areas is much more difficult, whereby, in addition, the aspect of traffic obstructions should be noted here as a substantial disadvantage.

In the course of constructing line systems and data networks with high transmission densities and rates, fiber optic or glass fiber cables represent a substantial improvement and it has already been common for some time to avoid the excavation and construction work required for laying them by using the existing underground infrastructure of the supply and disposal networks, in particular e.g. of sewage systems, for laying special lines and cables of this type in housing developments, cities and the like. It has become routine in many large cities to not only lay data transmission, control and information carrier cables, but also e.g. power cables, in underground conduit systems in already existing gallery systems of this type.

The great advantage of this type of cable laying is that it is no longer necessary to open the ground, associated with a destruction of traffic areas, pavements and significant traffic interference for people and vehicles resulting therefrom, for laying a cable or cable line with all the unpleasant consequences, as a result of which considerable cost savings are obtained and, at the same time, relatively high flexibility with respect to the laying section.

Of course, a substantial requirement continues to exist, namely that the laying in underground supply and disposal systems can take place with as low an expenditure as possible and that a quick and effective laying of cables, lines and the like is made possible under the inherently more difficult conditions existing in conduit systems.

A prior technology for laying cables and cable lines existed generally in that cable supports with dish-shaped or channel-shaped housings for holding or clamping the cable to be laid are installed in each case on the walls of the duct or the like at relatively short distances from one another and that the cables are fastened on both sides on the cable supports, laterally and toward the front, cable cover plates, hoods or the like formed of relatively rigid materials such as, in particular, plastic.

Since that time, various proposals for cable ducts have become known which can be continuously laid, e.g. that can be unwound from winding drums, elastically flexible, with corresponding multiple gutters or hollow profiles for housing and holding the cable.

BRIEF SUMMARY OF THE INVENTION

It is accordingly an object of the invention to provide a cable duct that overcomes the above-mentioned disadvantages of the prior art devices of this general type, which is formed with individual modules that are identical to each other and which can be assembled to form an almost "endless" continuous cable duct line in the region of the insertion opening of a branch shaft leading to the actual duct provided for the duct placement with little manipulation expenditure. The cable duct line can then be inserted continuously into the duct and then fastened there to its top, walls or the like, advantageously by a known automatically operating cable duct assembly truck, so that the cable or cable lines to be laid in the cable duct can then be inserted in the at least one continuous, longitudinally extending cable housing chamber.

With the foregoing and other objects in view there is provided, in accordance with the invention, a cable duct for cables or cable lines to be laid along walls, partitions, and tops of subterranean tubes, vaults, tunnels, ducts, or shafts extending generally horizontally, diagonally ascending or descending and/or curved or with bends, for conducting water, sewage, energy and electrical transport lines, telephone lines, data and information transfer lines, glass fiber cables, optical conductor cables, and/or cable lines. The cable duct is inserted or pulled in from a surface into the tube, the vault and the like through generally vertical or diagonal access or branch shafts respectively and fastened to the wall, the partition or the top. The cable duct contains a drive chain in a manner of a bicycle drive chain. The drive chain has longitudinal cable duct body elements disposed one behind another in a longitudinal direction. The cable duct body elements have end regions connected to one another about a pivot axis disposed generally at a right angle to the longitudinal direction and are mutually pivotable relative to one another at a lateral angle. Each of the cable duct body elements have at least one web and two cover plates spaced from one another by the at least one web and are held parallel to one another and joined together by the at least one web. The cover plates each have longitudinal edges with locking elements disposed along the longitudinal edges, the locking elements are interlocking elements or counter locking elements. Covering elements, being either edge cover strips or cover profiled strips formed of a bendable or elastically flexible material, are disposed on both sides of the cable duct body elements. The covering elements have longitudinal edges with cover locking elements disposed along the longitudinal edges and continuously pass through the locking elements of the cover plates of the cable duct body elements resulting in a form-locking connection between the locking elements and the cover locking elements. The covering elements laterally close off the cover plates on both sides and are disposed on both sides of the at least one web between the cover plates. The cover locking elements are either interlocking elements or counter locking elements. The covering elements, the cover plates and the at least one web define first laterally open chambers toward both sides for receiving the cables or the cable lines. Two of the cable duct body elements separated from one another by the respective web, define the bicycle drive chain, are mutually pivotable at the lateral angle and define continuous longitudinal chambers, closed generally all around, for inserting and housing the cables or the cable lines.

The novel cable duct which is joined together so as to be mutually pivotable at a (lateral) angle in a chain link-type manner, formed with advantageously identical module units each, is distinguished by high mechanical stability, entirely sufficient protection for the cable, lines and the like laid inside it, against contamination as well as, furthermore, by simple and problem-free insertability into a respective duct system, which is, in particular, a result of the already briefly discussed mutual angular pivotability of the new module-type cable duct body elements. To a certain extent, a curving or bending in a vertical direction or a torsion or 3D torsion of the novel cable duct composed of the mutually individual modules that can be turned at least a little about its longitudinal axis in each case is also possible. On the one hand, this facilitates the adaptation to the topographic conditions prevailing inside the sewage ducts and, on the other hand, also the insertion of the novel cable duct into the ducts via the conventional vertical or diagonal access or branch shafts that open into the actual ducts.

In order to facilitate the layout of one or more cables or branch cables in a branch shaft, vertical shaft or the like which lead out of the duct leading to a main connection or the like, it is advantageous to form the edge cover strips on the outside with cable retaining profiled channels or the like.

An especially preferred embodiment of the modular cable duct body elements within the scope of the invention which can be connected to one another and are ultimately joined to form the cable duct, the body elements being distinguished by high mechanical stability and extensive insulation of the cables laid or conveyed therein against the environment in the sewage duct.

According to an added embodiment of the invention, the cable duct body elements are each joined together laterally in an angularly adjustable manner via the central axial recesses and the pivot axis stumps. A first one of the cable duct body elements with the pivot extension of the cover plate interlocks with the pivot axis stump of a second adjacent one of the cable duct body elements in a slidable manner.

According to a further embodiment of the invention, the pivot axis stump of the web extension and the web extension itself are each formed with a straight opening for receiving fastening elements for mounting the cable duct to the wall, the partition or the top of a water or sewage tube, or duct.

An embodiment of the body element module of the novel cable duct according to the invention results in high flexibility in which the individual cable duct body elements are each formed with two identical half-body elements which can be joined by guide pins or the like. Each of the two identical body element halves are formed by one of the cover plates and a half-web formed by dividing the web in half longitudinally.

In another embodiment, an advantageous type of connection of the just noted half-module bodies to one another, each to form a complete cable duct body element.

A "centrosymmetrical" embodiment of the novel cable duct body elements which deviate from the basic form, whereby e.g. their upper cover plates are connected to one another, so to say via "head/tail", i.e. via a pivot extension and pivot axis recess, and their "lower" cover plate via "tail/head", i.e. diametrically or inversely to the aforementioned arrangement, i.e. are each connected to one another in an angular pivotable manner via pivot axis recess and pivot extension.

In an embodiment of the pivot axis recesses of the pivot extensions, of the cover plates of the cable duct body elements, e.g. in the form of elongated holes, a relatively high "vertical flexibility" or upward or downward bending of the new cable duct formed with the body elements is assured, which increases its adaptability to the respective interior topography of the sewer.

In accordance with an added feature of the invention, the cable duct body elements are formed from an inert, fiber-reinforced plastic having a relatively low elastic flexibility and is stable for a long time vis-à-vis substances present in sewage. The plastic is preferably polycarbonate, polyamide, polypropylene, polyvinyl chloride, or polyurethane. The coverings are formed from an inert plastic being stable over a long period and preferably polyvinyl chloride, polyamide, polypropylene or PVC.

It is advantageous if the edge cover strips are formed of a plastic material which, although it is less rigid than the material forming the cable duct body elements and, for reasons of load-carrying capacity and mechanical strength, basically has a relatively slight elastic flexibility, i.e. more rigid plastic material, however, it cannot, however, be described by any measure as "slack". The flexibility of the edge cover strips should be provided in such a way that they can also effect the lateral curvatures of the cable duct without special resistance, however, on the other hand, that the mechanical stability, strength and load-carrying capacity as well as robustness of the cable duct is ensured and that it does not result in a disintegration of body elements and edge cover strips by, for example, the cover strips possibly coming loose from the body elements.

An embodiment of the new cable duct is disclosed in which unpleasant disturbances in the duct system, such as e.g. blockages, are largely avoided and that otherwise also maintenance work to be carried out periodically can be omitted in many cases. More specifically, each of the cable duct body elements formed with two edge cover strips have a smooth surface, and as a result of the smooth surface, coarser impurities are prevented from adhering and thus a sewage duct or sewage line is prevented from blocking.

Other features which are considered as characteristic for the invention are set forth in the appended claims.

Although the invention is illustrated and described herein as embodied in a cable duct, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a diagrammatic, perspective view of two cable duct parts each composed of several cable duct body elements;

FIG. 3A is a diagrammatic, sectional view of a detail of an interlocking connection between the two cover plates of a cable duct body element with the continuous elastically flexible lateral or edge cover strips provided for its side covering;

FIG. 3B is a diagrammatic, cross-sectional view of an edge cover strip formed for retaining branch cables or the like with cable retaining profiled channels extending on the outside;

DETAILED DESCRIPTION OF THE INVENTION

Figure 1:
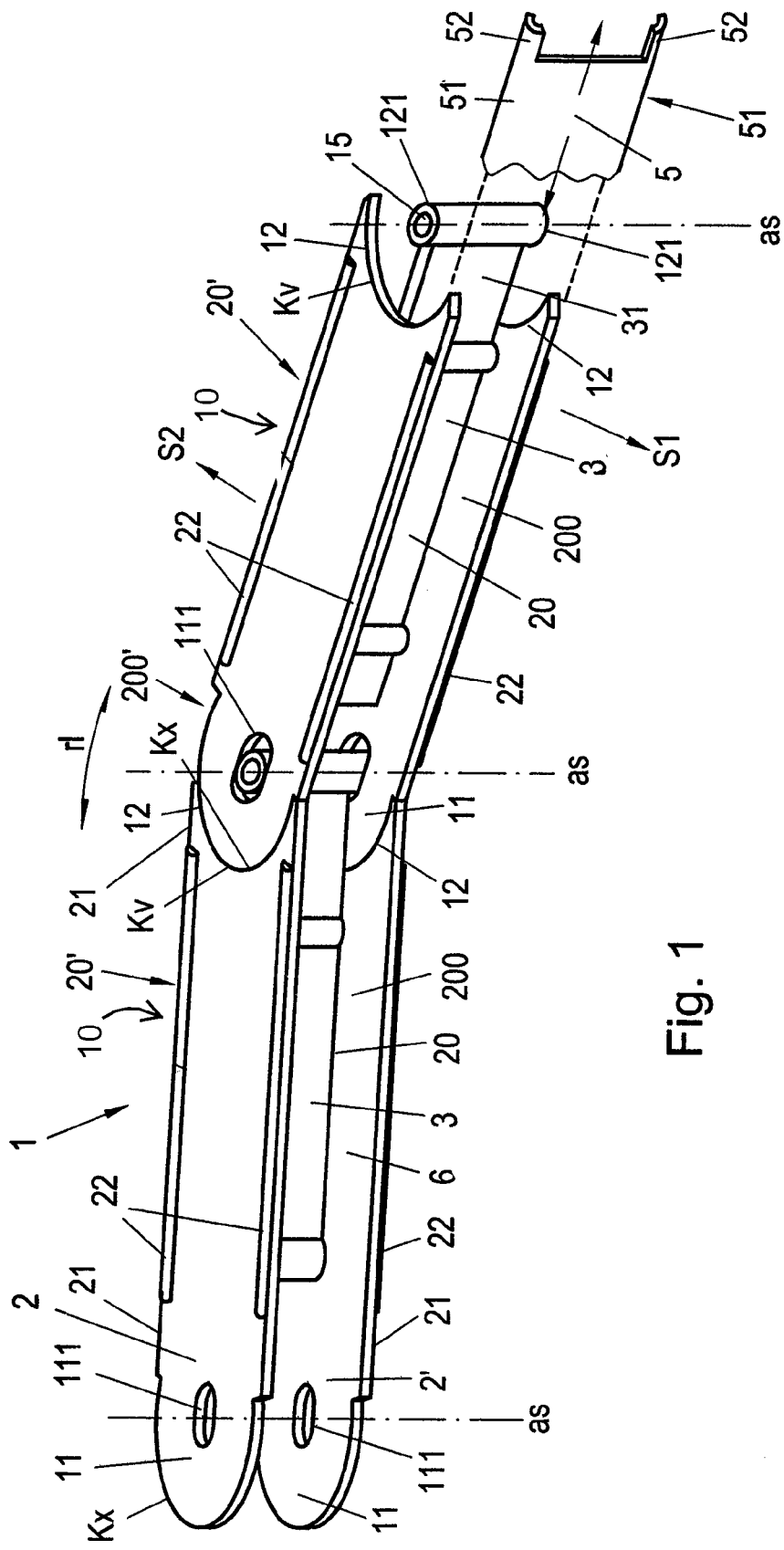
FIG. 1 is a diagrammatic, perspective view of two pivotally connected body elements of a cable duct according to the invention.

Referring now to the figures of the drawing in detail and first, particularly, to FIG. 1 thereof, there is shown a part of a cable duct 1 according to the invention. The cable duct 1 has two identical, modular elongated cable duct body elements 10 which are disposed about a common pivot axis as at a right angle to a longitudinal direction rl so as to be pivotable at an angle. Each of the body elements 10 has an upper and a lower cover plate 2, 2' which are disposed parallel to one another and at a distance from one another, whereby a web 3 is found between these two cover plates 2, 2' longitudinally in the center which connects these two cover plates 2, 2'.

The two cover plates 2, 2' of the body elements 10 are each both made—on the left here—with a pivot extension 11 having a circular convex contour Kx with a pivot axis recess 111 disposed in the center of a circular arc. On the right side, both cover plates 2, 2' have a pivot recess 12 in which a web extension 31 of the aforementioned web 3 which connects the cover plates 2, 2' projects. Finally, the web 3 has a type of columnar thickening with a pivot axis stump 121 projecting beyond the aforementioned web extension 31, upward and downward, generally to the extent of the material thickness of the cover plates 2, 2' at the point of the center of the pivot recess 12 having the circular concave contour Kv. The swivel axis stump 121 and the thickening of the web extension 31 (not shown in greater detail) which supports it, in this case more or less columnar in shape, are on the whole passed through by a continuous opening 15 which are used to house fastening devices which pass through it, i.e. in particular screws or the like, for the assembly of the cable duct 1, e.g. to a cover of a sewer. The two pivot axis stumps 121 of each of the cable duct body elements 10 each protrude into the corresponding pivot axis recess 111 of the pivot extensions 11 of the two cover plates 2, 2' of the respectively adjacent cable duct body element 10 of the cable duct line 1 and form a cover plate pivot connection.

In the right body element 10 in the illustration of FIG. 1, it is indicated that the axial recess 111 can be formed as an elongated hole in longitudinal direction, as a result of which a deformation or upward or downward curvature of the cable duct 1 formed with the body elements 10 disposed in a row in "vertical direction" is made possible to adapt to the corresponding upward or downward curved slope of the sewer cover.

The convex contour Kx of the circular extensions 11 of the two cover plates 2, 2' of the cable duct body element 10, disposed on the right in FIG. 1, corresponds generally in an easy torsional fit to the concave contour Kv of the pivot axis recesses 12 of the cover plates 2, 2' of the cable duct body element 10 adjoining them on the left. Open chambers 20, 20' are produced on both sides of the central web 3 in each of the cable duct body elements 10 between the two cover plates 2, 2', toward both sides S1, S2 in each case.

By joining several body elements 10 to form the cable duct 1, two continuous longitudinal chambers 200, 200' which "bridge" all of these body elements 10, are ultimately created in which cables 6 or cable lines to be laid can be inserted and ultimately accommodated, in particular after the chambers have been closed on both sides S1, S2.

The chambers 20, 20' of the cable duct body elements 10 are finally closed on both sides S1, S2 by a straight, continuous edge cover strip 5, only shown as a short piece in FIG. 1, formed of an elastically flexible plastic material which is provided on its two longitudinal edges 51 with groove and tongue-like interlocking elements 52. These interlocking elements 52 interlock with corresponding counter interlocking elements 22 on the longitudinal edges 21 of both cover plates 2, 2' of each of the cable duct body elements 10 or engage in them in a groove and tongue manner. This not only gives a form-closed connection but also a force-locking connection between the continuous edge cover strips 5 which each close the cable duct 1 on both sides and the cover plates 2, 2', but also ensures the cohesion of the body elements 10, which is especially important when the body elements 10, as described in greater detail in the following, are formed "in two parts", in particular with cable duct half-body elements 100, 100' divided e.g. in the longitudinal center and each joined together to form a whole body element A form-locking connection is one that connects two elements together due to the shape of the elements themselves, as opposed to a force-locking connection, which locks the elements together by force external to the elements.

A form-locking connection is one that connects two elements together due to the shape of the elements themselves, as opposed to a force-locking connection, which locks the elements together by force external to the elements.

Figure 2:
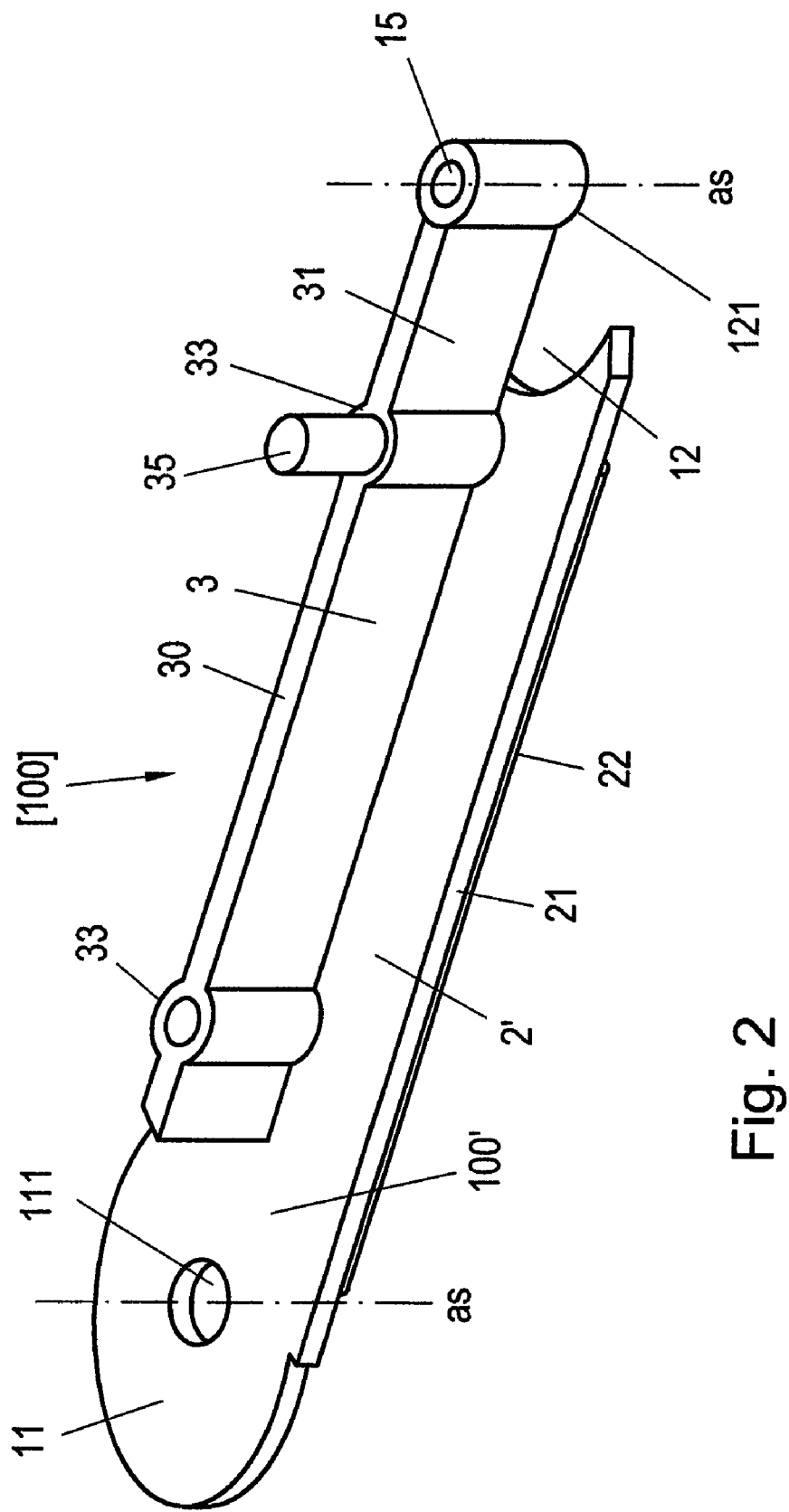
FIG. 2 is a diagrammatic, perspective view of a cable duct half-body element which can be connected or joined together according to the invention with a second identical half-body element to form a complete cable duct body element.

With the meaning of the reference symbols remaining the same, FIG. 2 shows a "lower" cable duct half-body element 100', as just noted above. It has per se the same structure as the cable duct body element 10 according to FIG. 1, however, after the web 3 has been divided in the longitudinal center, it is only formed with the "lower" cover plate 2' and the web 3 which has been halved in the longitudinal center and connected with it, i.e. with the "half-web" 30.

Two columnar thickenings 33, which are spaced from one another in the course of the web, are indicated there with a central recess in which a guide pin, peg 35 or the like is situated which is provided for connecting the half-body element 100' with a non-illustrated second "upper" cable duct half-body element [100]. This non-illustrated cable duct half-body element [100] is identical to the lower half-body element 100' and disposed symmetrically thereto, relative to the longitudinal central sectional plane of the web 3, and the two half-body elements 100' [100] are connected to one another by guide pins 35.

A substantial advantage of the "divided" structure of the cable duct body elements 10 of the cable duct 1 according to the invention shown here is that a number of similar half-body elements 100' [100] are available here and that their assembly to form the cable duct body elements 10 and ultimately to form the continuous cable duct 1 formed with them is substantially facilitated.

FIG. 3 illustrates, with otherwise the same the reference symbols, the invention in greater detail with reference to two parts of the new cable duct 1, each containing several cable duct body elements 10:

A part of the cable duct 1 assembled from several body elements 10 with lateral edge cover strip 5 is shown there which covers the cable housing chamber 20 of one of the cable duct body elements 10 which is open to the front side S1 and cooperates with its interlocking elements 52, which engages in the counter interlocking elements 22 of the two cover plates 2, 2' with them in a form-locking and force-locking manner. The reference numbers 101 and 102 appear in FIG. 3 that designate the two "ends" of the third body element 10 there.

The sectional view of FIG. 3A shows this in greater detail, with otherwise the same reference symbols.

FIG. 3B shows a diagonal view of a part of an edge cover strip 5 configured here for three cable support profiles having channels or grooves 55 configured to hold branch cables 6' in a clamp-like manner. Branch cables 6', e.g. led from the cable duct 1 through corresponding openings in the edge cover strip 5, be accommodated therein, it being possible to ultimately lead the branch cables 6' into a branch shaft leading to a main connection or the like, inserted and e.g. fixed by flexible snapping into the respective channel 55. Of course, additional "other" cables, lines or the like which accompany the cable duct 1 over longer distances can also be led in the sectional channels 55 of the edge cover strip 5.

Figure 4:
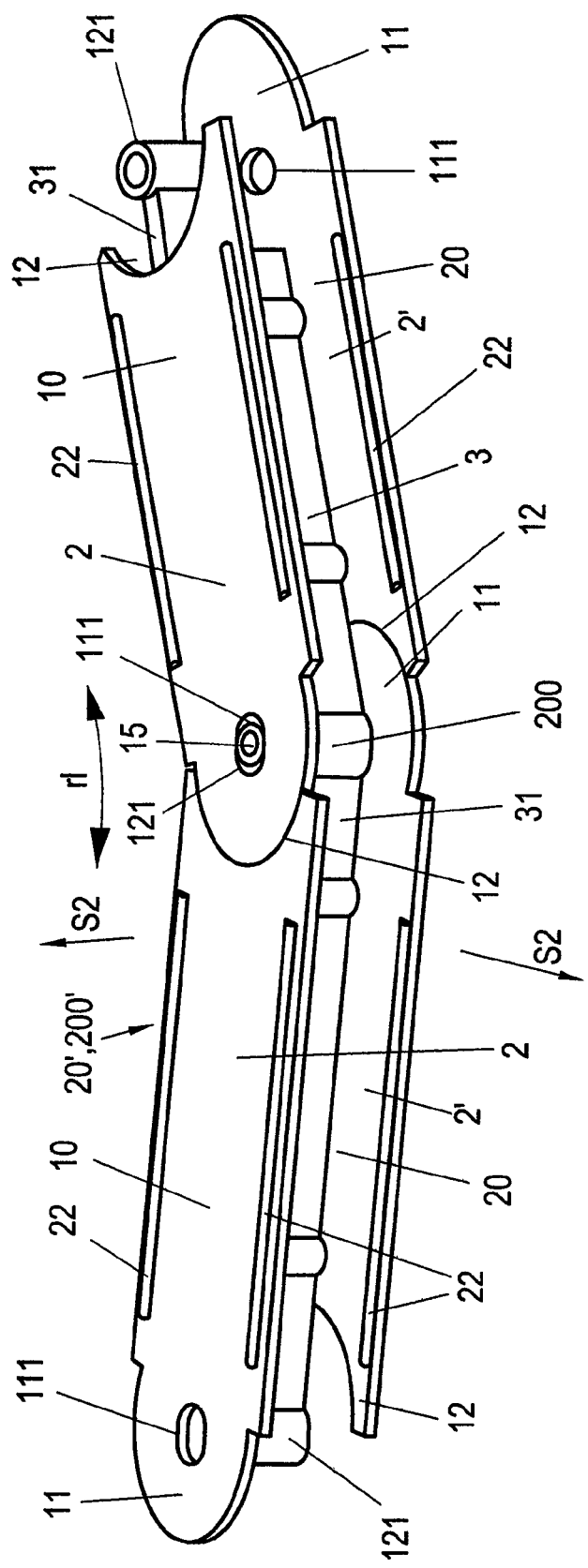
FIG. 4 is a diagrammatic, perspective view of a cable duct according to the invention in greater detail with the edge cover strips closing it on both sides.

With otherwise the same reference symbols, FIG. 4 serves to illustrate the subject matter of the invention in an embodiment with "centrosymmetrical" cable duct body elements 10 in which the torsionally cooperating pivot extensions 11 and pivot recesses 12 of the cover plates 2, 2' are disposed alternately or diametrically to one another on the respectively various ends of the cable duct body elements 10. The half-body elements 100, 100' shown in FIG. 2, which can be disposed and joined together only diametrically with respect to direction, are especially advantageous for the body elements 10 formed in this way.

Figure 5:
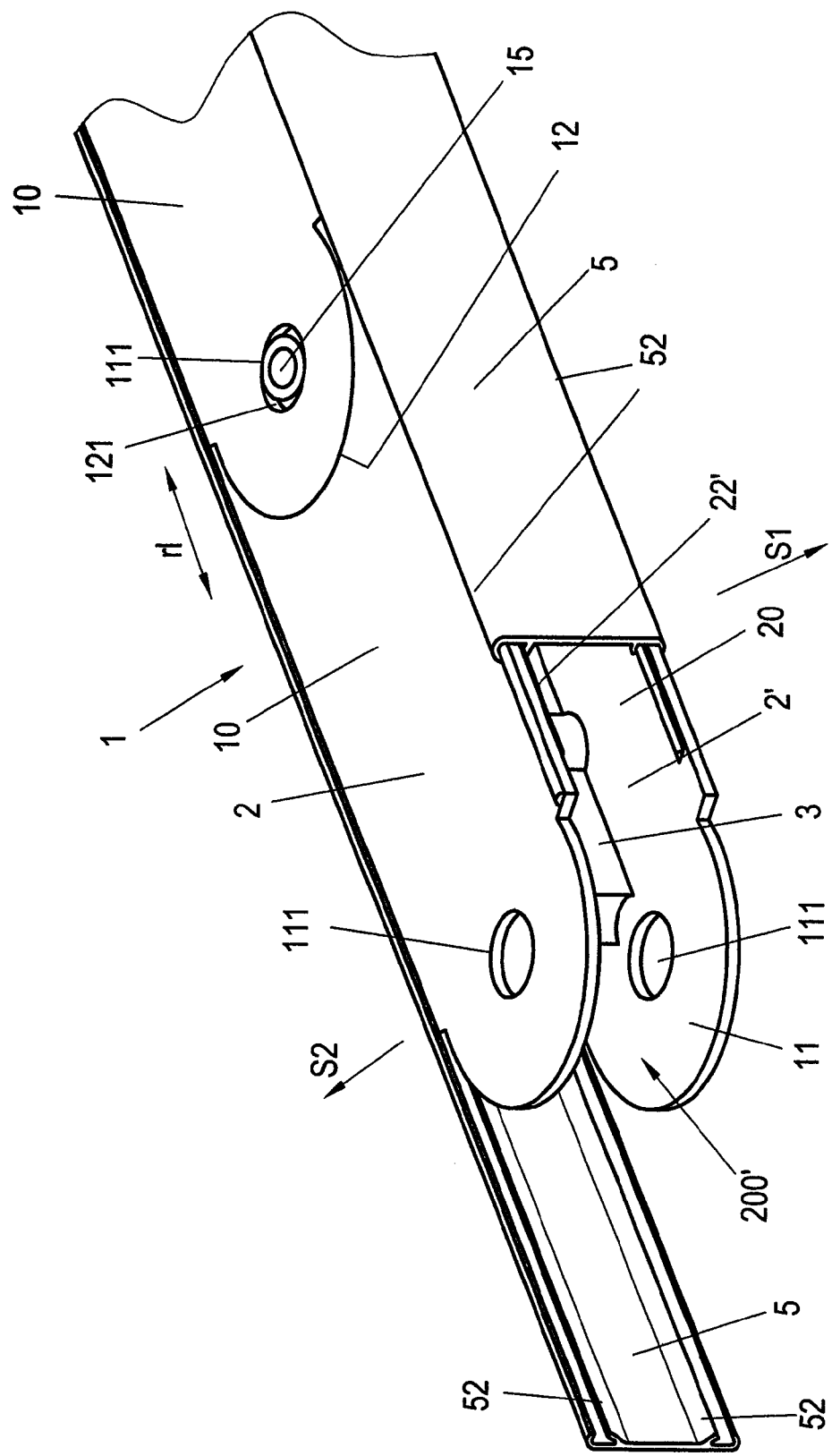
FIG. 5 is a diagrammatic, perspective view of a further advantageous embodiment of the new cable duct with a "centrosymmetrical" cable duct body element.

Finally, with otherwise the same reference symbols, FIG. 5 shows a cable duct 1 according to the invention with the continuous edge cover strips 5 attached to its body elements 10 on both sides.

With respect to installing the new cable duct via a vertical branch shaft into the tube(s) or duct(s) provided for the cable laying, the body elements are assembled to form the new cable duct in the area of the shaft opening and continuously led vertically downward such that the pivot axes of the body elements are generally horizontal, so that the cable duct can be brought from the vertical into the horizontal without difficulty while turning the body elements, preferably while using a guide baffle or the like which bridges the transition from the branch shaft into the duct. It can then e.g. be fastened to a tube or duct sidewall. If it is to be mounted in the duct cover, then a turning of the cable duct can already continuously take place during the insertion after the "horizontal" duct has been obtained in such a way that the pivot axes between the body elements are oriented generally at a right angle and the cover fastening means can be installed through the "hollow" axes.

The invention claimed is:

1. A cable duct for cables or cable lines to be laid along walls, partitions, and tops of subterranean tubes, vaults, tunnels, ducts, or shafts extending generally horizontally, diagonally ascending, diagonally descending, curved or with bends, for conducting at least one of water, sewage, energy and electrical transport lines, telephone lines, data and information transfer lines, glass fiber cables, optical conductor cables, and cable lines, the cable duct being inserted or pulled in from a surface into the tube, the vault and the like through generally vertical or diagonal access or branch shafts respectively and fastened to the wall, the partition or the top, the cable duct comprising:

a drive chain in a manner of a bicycle drive chain, said drive chain having longitudinal cable duct body elements disposed one behind another in a longitudinal direction, said cable duct body elements having end regions connected to one another about a pivot axis disposed generally at a right angle to the longitudinal direction and being mutually pivotable relative to one another at a lateral angle, each of said cable duct body elements having a web and two cover plates spaced from one another by said web and held parallel to one another and joined together by said web, said cover plates each having longitudinal edges with locking elements disposed along said longitudinal edges, said locking elements selected from the group consisting of interlocking elements and counter locking elements;

covering elements, selected from the group consisting of edge cover strips and cover profiled strips, formed of a bendable or elastically flexible material and disposed on both sides of said cable duct body elements, said covering elements having longitudinal edges with cover locking elements disposed along said longitudinal edges and continuously passing through said locking elements of said cover plates of said cable duct body elements resulting in a form-locking connection between said locking elements and said cover locking elements, said covering elements laterally closing off said cover plates on both sides and are disposed on both sides of said web between said cover plates, said cover locking elements being selected from the group consisting of interlocking elements and counter locking elements;

said covering elements, said cover plates and said web defining first laterally open chambers toward both sides for receiving the cables or the cable lines; and two of said cable duct body elements separated from one another by said respective web, defining said bicycle drive chain, being mutually pivotable at said lateral angle and defining continuous longitudinal chambers, closed generally all around, for inserting and housing the cables or the cable lines.

2. The cable duct according to claim 1, wherein said edge cover strips have outer sides with a profile formed thereon, said profile having at least one continuous groove formed therein for housing, guiding and holding the cables, at least one of the cable lines and branch cables led out of the cable duct and ultimately leading through a branch or distributing shaft to a main connection.

3. The cable duct according to claim 2, wherein said continuous groove is a continuous channel.

4. The cable duct according to claim 1, wherein:
said web has a web extension with a pivot axis stump;
each of said cover plates of said cable duct body elements includes a first end having a pivot extension with a circular convex contour and a central axial recess formed therein; and
each of said cover plates has a second end with a pivot recess formed therein having a circular concave contour corresponding to said circular convex contour and in which said web and said web extension protrudes into an area of a circular center of said pivot recess, said pivot axis stump projecting at least toward one side, at least one of upward and downward, said pivot axis stump having an outer contour corresponding an inner contour of said central axial recess on said pivot extension of said cover plates.

5. The cable duct according to claim 4, wherein said cable duct body elements are each joined together laterally in an angularly adjustable manner via said central axial recesses and said pivot axis stumps, a first one of said cable duct body elements with said pivot extension of said cover plate interlocking said pivot axis stump of a second adjacent one of said cable duct body elements in an slidable manner.

6. The cable duct according to claim 4,
further comprising fastening elements; and
wherein said pivot axis stump and said web extension have a straight opening formed therein for receiving said fastening elements for mounting the cable duct to the wall, the partition or the top of the water or sewage tube, or the duct.

7. The cable duct according to claim 6, wherein said fastening elements are anchoring screws.

8. The cable duct according to claim 4, wherein each of said cable duct body elements has two parts with two identical body element halves, each of said two identical body element halves formed by one of said cover plates and a half-web formed by dividing said web in half longitudinally.

9. The cable duct according to claim 8,
further comprising fasteners selected from the group consisting of pins and peg-shaped plug connecting elements; and
wherein said two identical body element halves are connected and joined together to form one of said cable duct body elements by said fasteners joining said half-webs to form said web.

10. The cable duct according to claim 8, wherein:
each of said cable duct body elements is formed from said two cover plates and said half-webs;
a first of said two cover plates includes a first side having said pivot extension with said central axis recess and a second side with said pivot recess, and said web extension with said pivot axis stump is directed toward said second side; and
a second of said two cover plates includes said pivot extension, said pivot axis recess and said web extension with said pivot axis stump directed to a respectively "opposite" or "diametrical" side relative to said first cover plate.

11. The cable duct according to claim 8, wherein:
said identical body element halves are formed from an inert, fiber-reinforced plastic having a low elastic flexibility and is stable for a long time vis-à-vis substances present in sewage, said plastic being selected from the group consisting of polycarbonate, polyamide, polypropylene, polyvinyl chloride, and polyurethane; and
said covering elements are formed from an inert plastic being stable over a long period and selected from the group consisting of polyvinyl chloride, polyamide, polypropylene, and polyvinyl chloride.

12. The cable duct according to claim 4, wherein for enabling a curved run in the vertical direction or a torsion run thereof, said central axis recesses of said pivot extensions are formed with a tolerance distance or space vis-à-vis an outer contour of said central axis recess and an outer contour of said pivot axis stump.

13. The cable duct according to claim 4, wherein for enabling a curved run in the vertical direction or a torsion run thereof, said central axis recesses of said pivot extensions are formed as elongated holes aligned in said longitudinal direction spaced from an outer contour of said pivot axis stump.

14. The cable duct according to claim 1, wherein:
said cable duct body elements are formed from an inert, fiber-reinforced plastic having a low elastic flexibility and is stable for a long time vis-à-vis substances present in sewage, said plastic being selected from the group consisting of polycarbonate, polyamide, polypropylene, polyvinyl chloride, and polyurethane; and
said covering elements are formed from an inert plastic being stable over a long period and selected from the group consisting of polyvinyl chloride, polyamide, polypropylene, and polyvinyl chloride.

15. The cable duct according claim 1, wherein each of said cable duct body elements formed with two said edge cover strips has a smooth surface, and as a result of said smooth surface, coarser impurities are prevented from adhering and thus the sewage duct or sewage line is prevented from blocking.

16. The cable duct according to claim 1, wherein said cable duct body elements are similar in shape and dimension to each other.

17. The cable duct according to claim 1, wherein said web is disposed in a longitudinal center of said cable duct body elements.

18. The cable duct according to claim 1, wherein said covering elements have counter interlocking elements connected with said interlocking elements of said cover plates in a force-locking manner.

19. The cable duct according to claim 1, wherein said covering elements have a smooth outer surface.

* * * * *